July 3, 1928. 1,675,361
M. R. LAYMAN
SODA FOUNTAIN ICE CREAM MACHINE AND PROCESS OF
MANUFACTURING AND DISPENSING ICE CREAM
Filed May 1, 1926 3 Sheets-Sheet 1
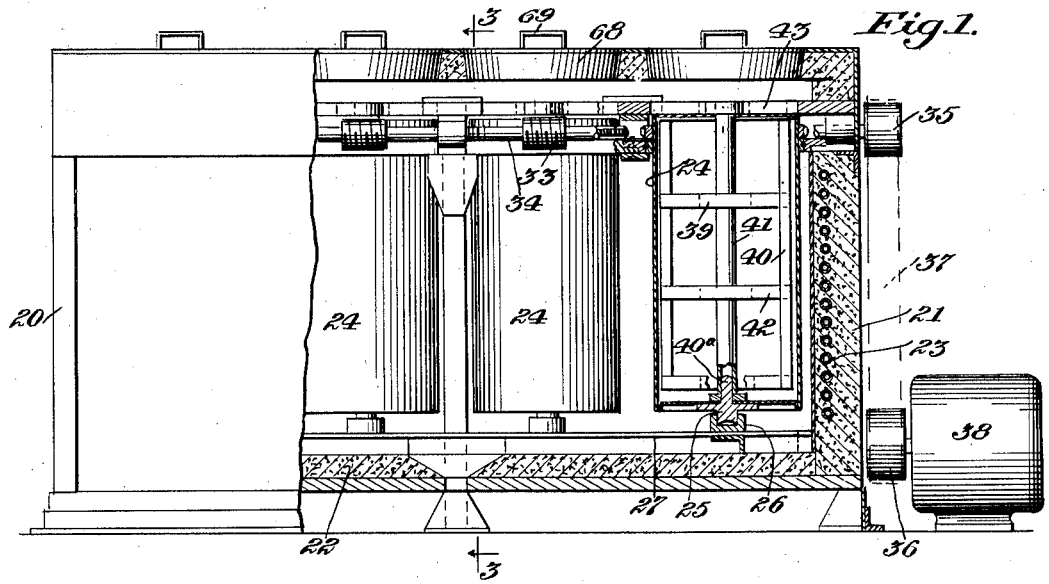
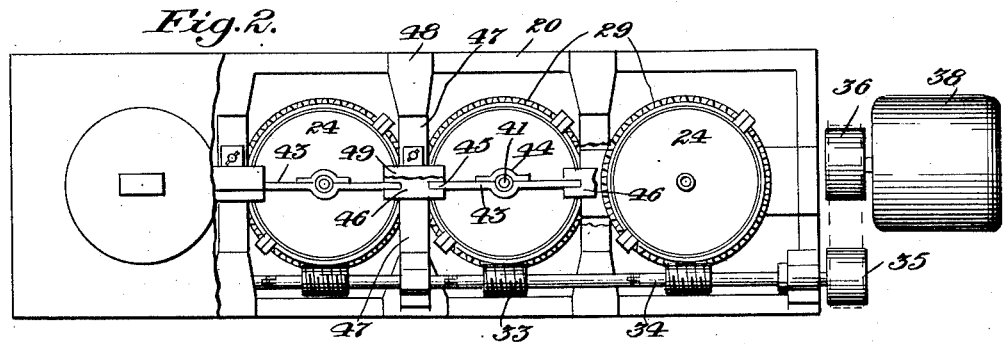
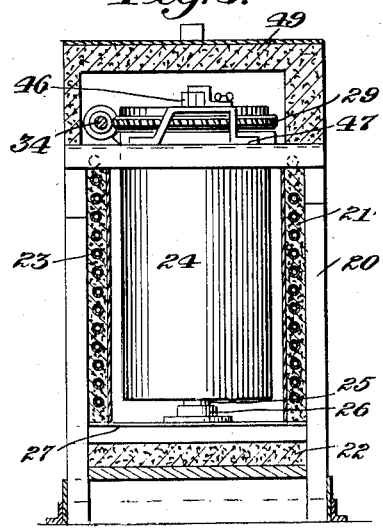
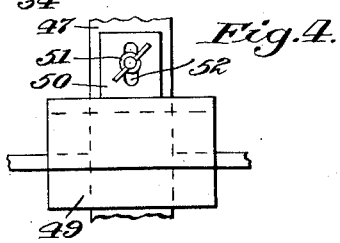
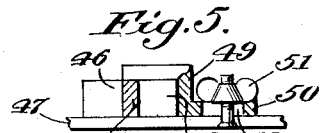
Inventor:
Milton R. Layman,
by H. B. Moses
Att'y.

July 3, 1928.
M. R. LAYMAN
SODA FOUNTAIN ICE CREAM MACHINE AND PROCESS OF
MANUFACTURING AND DISPENSING ICE CREAM
Filed May 1, 1926    3 Sheets-Sheet 2
1,675,361
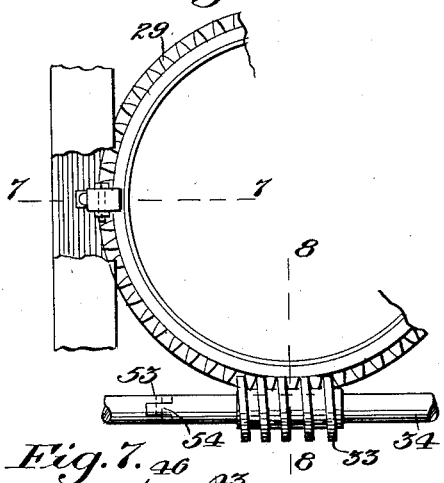
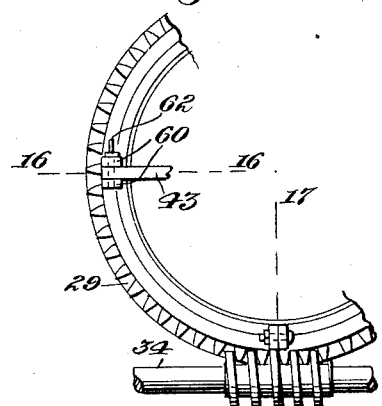
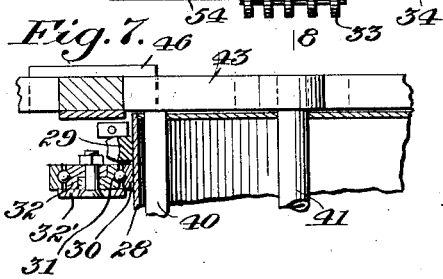
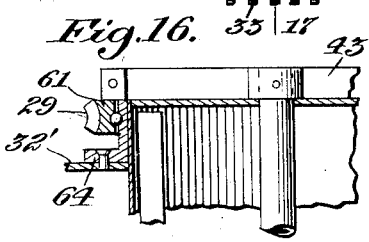
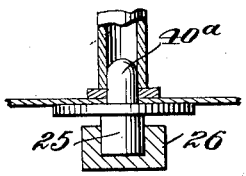
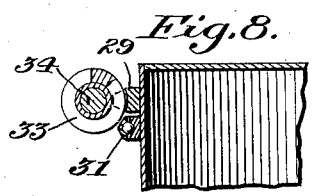
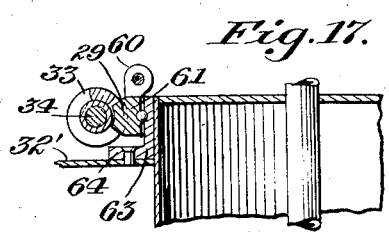
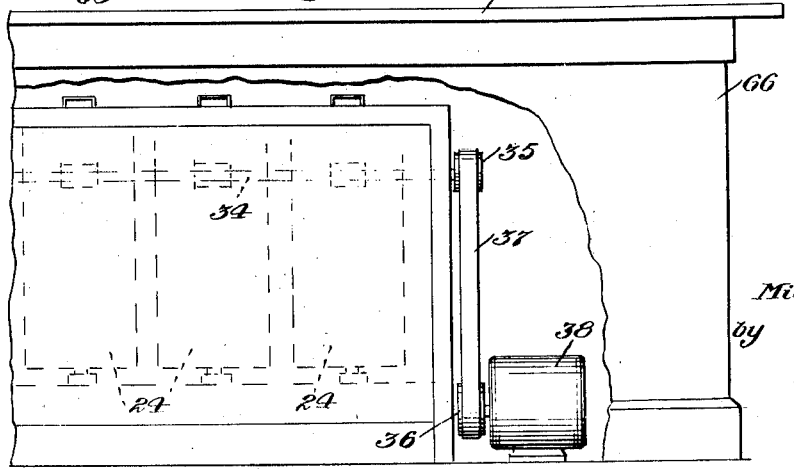
Inventor:
Milton R. Layman,
by
H. B. Moses
Atty.

July 3, 1928.
M. R. LAYMAN
SODA FOUNTAIN ICE CREAM MACHINE AND PROCESS OF
MANUFACTURING AND DISPENSING ICE CREAM
Filed May 1, 1926     3 Sheets-Sheet 3
1,675,361
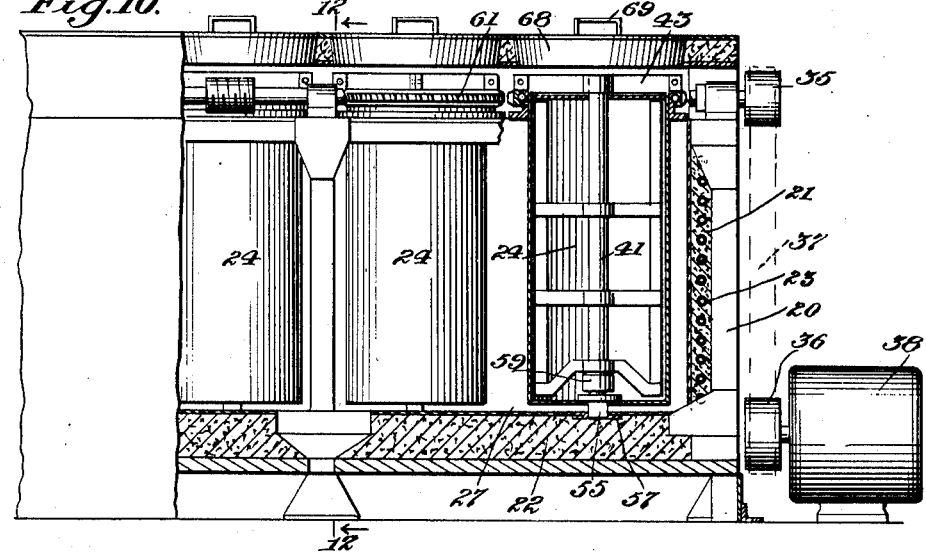
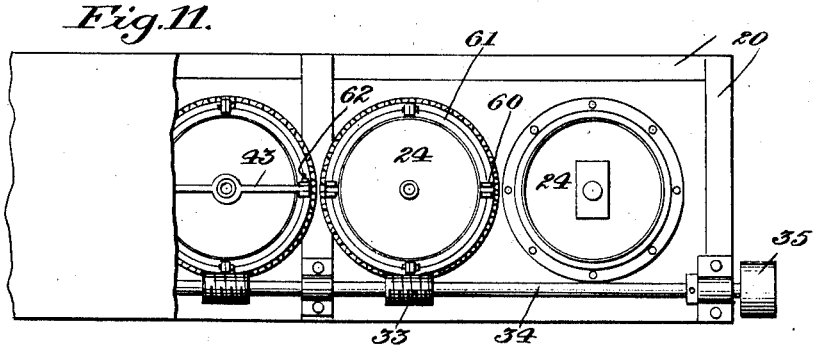
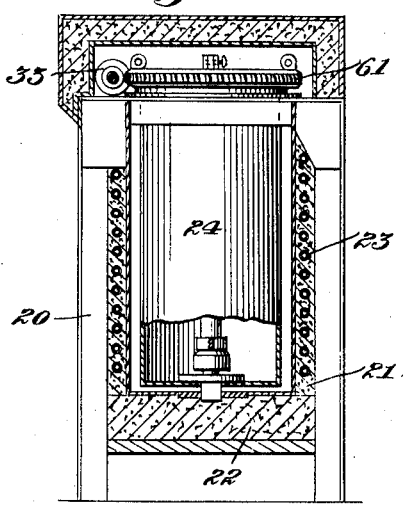
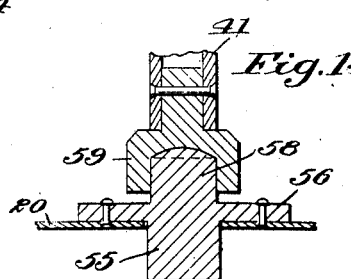
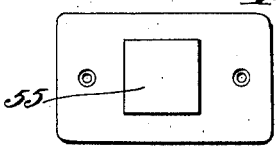
Inventor:
Milton R. Layman,
by
Atty.

Patented July 3, 1928.

1,675,361

UNITED STATES PATENT OFFICE.

MILTON R. LAYMAN, OF JOHNSTOWN, PENNSYLVANIA.

SODA-FOUNTAIN ICE-CREAM MACHINE AND PROCESS OF MANUFACTURING AND DISPENSING ICE CREAM.

Application filed May 1, 1926. Serial No. 106,114.

My present invention relates to the manufacture of ice cream in refrigerated soda fountains now in extensive use for maintaining ice cream in proper condition for dispensing and consumption thereof. Soda fountains of this type generally have a framework of angle irons supporting walls of cork or other insulating material, and ammonia coils and a brine solution or other liquid type of cooling agent also generally present. The cans of ice cream are usually inserted into the soda fountain for dispensing.

One object of my present invention is to manufacture ice cream in the dispensing cans, thus avoiding the use of a separate freezing apparatus and the necessary changing and replacement of cans, reducing the number of cans or containers needed and avoiding the transfer of the ice cream from can to can. Another object is to utilize the usual refrigerating equipment of standard soda fountains for freezing ice cream, as well as for maintaining it in edible condition for serving.

One novel feature involves the insertion of shafting and gears in a standard soda fountain for causing the ice cream cans to rotate relatively to the dashers or paddles.

Another feature of the invention is the splining of the gears on the ice cream cans to permit removal of the cans when necessary.

An additional feature permits the freezing of ice cream in one or more cans as desired, in an installation containing a plurality of cans, the freezing when desired being arranged to follow in sequence in the several cans.

In a modified form the cans remain stationary, and paddles or dashers are rotated within the stationary cans for the necessary manufacture. The modified form also possesses novel features permitting removal of the cans when necessary and utilizing one or more cans, as desired, in an installation containing a plurality of cans.

By means of my invention ice cream may be manufactured and dispensed much more economically than heretofore, and by suitable timing of the manufacture of the ice cream it can be served in absolutely and strictly fresh condition to the customers, and this serving of absolutely and strictly fresh ice cream can be continued by reason of the sequential manufacture in the different cans. In other words, my invention permits of controlling the completion of the manufacture of cansful of ice cream to take place at about the time that experience shows that the previous supply becomes exhausted.

The invention may be more fully understood from the following description in connection with the accompanying drawings, wherein Fig. 1 is an elevation, partly in section, showing the embodiment wherein the cans are rotated.

Fig. 2 is a plan view of Fig. 1, partly in section.

Fig. 3 is a central vertical section of Fig. 1 on the line 3—3, looking in the direction of the arrows.

Fig. 4 is an enlarged detail in plan of the cross bar locking device.

Fig. 5 is an end view of Fig. 4, partly broken away to show the thumb nut adjusting slot.

Fig. 6 is an enlarged fragmentary plan of one of the gears and its interconnected worm, showing the joining means for the two halves of the gear and one clutch for the drive shaft.

Fig. 7 is a section on the line 7—7 of Fig. 6 showing the ball bearing retaining means.

Fig. 8 is a section on the line 8—8 of Fig. 6 showing the cut away portion of the holding bar at the point of meshing of the worm and gear.

Fig. 9 is an enlarged section of the bearing for the can bottom.

Fig. 10 is an elevation, partly in section, showing the embodiment in which the cans remain stationary.

Fig. 11 is a plan view of Fig. 10 partly in section.

Fig. 12 is a central vertical section on the line 12—12 of Fig. 10, looking in the direction of the arrows.

Fig. 13 is an enlarged vertical section of the dasher bearing.

Fig. 14 is a bottom plan view of the plate supporting the dasher bearing of Fig. 13.

Fig. 15 is an enlarged fragmentary plan of one of the modified gears for the rotating dasher, and its interconnected worm showing the joining means for the two halves of the gear.

Fig. 16 is a section on the line 16—16 of Fig. 15, showing the ball bearing supporting means.

Fig. 17 is a section on the line 17—17 of Fig. 15, showing one of the ears for fastening the two halves of the gear together.

Fig. 18 is a front elevation of a soda fountain, partly broken away to show the freezer-containers in combination therewith.

The embodiment illustrated in Figs. 1 to 9 includes an angle iron frame 20, supporting walls 21 and a base 22 of cork or other insulating material. Imbedded in the walls are coils 23 for permitting the circulation of ammonia or brine solution, or other type of cooling agent. A plurality of rotatable cans 24, 24 have supporting studs 25 rotatably inserted in bearings 26 rigidly secured to cross beams 27 of the angle iron. These supporting studs are secured to the bases of the cans, each having an upwardly projecting stud member extending through the can bottom for a purpose hereinafter described. Each rotatable can 24 has a key or spline 28 upon which is removably placed a split gear 29, in turn supported by a ball bearing ring 30 welded or otherwise rigidly attached to the can 24. Ball bearing rings 31 having integral flanges 32 maintain the usual ball races in position, the flanges of adjacent rings 31 being rigidly bolted to a supporting plate 32' connected to the frame work 20, this construction being clearly illustrated in Fig. 7. The rings 31 are cut away as shown in Fig. 8 to permit meshing of the gears 29 with the worms 33 secured on the drive shaft 34. The shaft 34 is rotated by any suitable means such as a pulley 35 operatively connected to the motor pulley 36 by a belt 37, the pulley 36 being operatively connected with the shaft of a small electric motor 38.

Within each can 24 is a dasher or paddle 39 of usual type pivotally mounted on an upwardly extending and rounded stud 40ª integral with the supporting stud 25. The dasher 39 is adapted to remain stationary during the rotation of the can, and has side blades 40 spaced from a central tube 41 by integral or rigidly fastened arms 42. The side blades 40 extend above the top of the can 24 and are joined by a bar 43 extending beyond the side blades and having a circular bend in the center portion to cooperate with a corresponding bend in a plate 44 centrally disposed in relation to the bar 43 and welded or otherwise rigidly fastened thereto, and these bends encircle the central tube 41. The two ends of the bar 43 are adapted to enter slots 45 formed between two vertical blocks 46 secured to substantially U-shaped angle plates 47 which are bolted or otherwise attached secure to supports or projections 48 rigid with the frame 20, and extending between adjacent cans from both front and rear of the frame. A plate 49 is placed on blocks 46 for holding the ends of bar 43 in place, and is maintained in position by a locking finger 50 adjustable to and from the locking position by means of a thumb nut 51 fastened to plate 47 and operating in a slot 52 within the locking finger 50. The gears 29 are preferably formed in halves which are bolted together after assembling, as shown in Fig. 2.

One feature of my invention is the rotating of one or more cans as desired. The use of plates 47 and 49 permit the ready removal of any dasher and the gearing of its associated can, thus maintaining the desired can or cans stationary. In addition, clutches comprising sockets 53 and studs 54, pin connected as shown in Fig. 6, permit the use of progressive operation, since each can starting from the motor end may be placed in operation in succession, in timed sequence. The operation of this type of installation is thus rendered extremely flexible to meet different service requirements.

Th embodiment illustrated in Figs. 10 to 17 shows a modification in which the can is maintained stationary, and the dasher is revolved within the can. This modification possesses the operating advantages of the first described apparatus and in addition has certain structural advantages more fully brought out in the subsequent description.

The general structure is similar, comprising a similar frame work 20, drive shaft 34, pulleys 35, 36, belt 37, and motor 38. The cans 24 are stationary, however, and each therefore has a central stud 55 integral with a plate 56 rigidly connected to the can bottom by rivets or other means, said stud 55 being square, and fitting into a corresponding socket 57 secured to the cross beam 27. An upstanding stud 58 integral with plate 56 serves as a pivotal bearing for a rotatably mounted socket support 59 rigidly secured to dasher tube 41, as shown in Fig. 13. The dasher bar 43 is inserted between lugs or ears 60 on a modified split gear 61, pins 62 securing the bar 43 in place. The gear 61 is formed in halves bolted together as shown in Fig. 15, and rotates on ball bearings supported in a ring 63 having an integral foot or flange 64 riveted, bolted, or otherwise secured to the plate 32'.

A cover may if desired be fitted in either embodiment.

The second embodiment has certain structural advantages; it is simple of construction and installation, and the control of each individual can is facilitated since any can may be placed in service as desired by securing bar 43 in ears or lugs 61. Removing bar 43 and dasher 39 permits removal of the associated can for cleaning and replacement.

In Fig. 18 I have illustrated the assembly of my ice cream machine with the soda fountain 65 having the front portion 66 and the table top or counter 67. As illustrated, I prefer to have the ice cream machine under, or at least partly under the dispensing counter, as a matter of convenience to the dispenser.

I prefer the refrigeration to be by mechanical means which may be of any type, or, in certain cases, I may use other means such for example as the usual mixture of cracked ice and salt packed around the cans.

A brief summary of the operation of the two modifications follows:

The cans and dashers having been inserted and secured in place, the necessary ingredients for the ice cream are placed in the cans. When using the rotating can embodiment, starting the electric motor rotates all the cans. Whenever desirable, however, gears may be removed from any of the cans by removing the dasher and the dasher securing means, thus permitting the use of as many cans as circumstances warrant for manufacturing and dispensing. The use of the pin-connected clutch, in combination with the other features of construction, permit the manufacture and dispensing of fresh made ice cream in the cans in sequence.

In the embodiment utilizing stationary cans and rotatable dashers, the general operation is similar. The removal of any individual dasher permits similar flexibility in operation, both in regard to the number of cans of ice cream manufactured and the sequence of manufacture followed.

The exemplifications of my invention set forth above are given merely by way of example and are not to be considered as limitations thereof; but my invention includes all of the modifications falling within the scope of the appended claims.

While I have described my invention in combination with soda fountains, it may equally well be used in ice cream storage cabinets, or in fact in combination with any refrigerated device in which the ice cream is to be stored.

The refrigerating container in which the cans 24 are located may be provided, with a view to convenience, with removable insulating covers 68, which in turn may be provided with suitable handles 69, to permit of easy removal and replacement of said covers. It will thus be an easy matter to dispense ice cream directly from the cans 24, and the ice cream may be protected and the temperature conserved by the use of said covers. The ice cream may be further protected by the can covers above referred to.

Having described my invention, what I desire to secure by Letters Patent of the United States is:—

1. The method of manufacturing, storing, and dispensing ice cream at a soda fountain, which comprises freezing ice cream ingredients into ice cream in receptacles positioned at a soda fountain, cooling said ingredients during the freezing by the cooling means of said soda fountain, allowing the resultant ice cream to remain within said receptacles until required for dispensing, and dispensing the ice cream from said receptacles without moving said receptacles.

2. The process as defined in claim 1 wherein ice cream is manufactured in the receptacles in sequence.

3. The method of manufacturing, storing, and dispensing ice cream at a soda fountain which comprises stirring ice cream ingredients in receptacles positioned within a soda fountain, simultaneously cooling said ingredients by the cooling means of said soda fountain, allowing the resultant ice cream to remain within said receptacles until required for dispensing, and dispensing the ice cream from said receptacles without removing the same from the soda fountain or changing their positions within the fountain.

4. The process as defined in claim 3 wherein ice cream is manufactured in the receptacles in sequence.

5. In combination, a soda fountain having a serving top, a refrigerator comprising a casing at said soda fountain, and an ice cream making, storing, and serving apparatus within said refrigerator casing and comprising an ice cream freezing can equipped with means for agitating the ice cream mix during freezing, a removable closure for said can, and a quickly openable and closable closure in said refrigerator casing and directly in line with said can closure whereby mixed ice cream ingredients may be frozen at said fountain, and stored and dispensed thereat as ice cream at said soda fountain, without being transported after the beginning of the freezing operation and before the step of dispensing as ice cream.

6. In combination, a soda fountain having a serving top, a refrigerator comprising a casing under said top, and an ice cream making, storing, and serving apparatus within said refrigerator casing and comprising an ice cream freezing can equipped with means for agitating the ice cream mix during freezing, a removable closure for said can, and quickly openable and closable closures in said refrigerator casing and directly in line with said can closure whereby mixed ice cream ingredients may be frozen at said fountain, and stored and dispensed thereat as ice cream at said soda fountain, without being transported after the beginning of the freezing operation and before the step of dispensing as ice cream.

7. In apparatus for the manufacture of ice cream, a refrigerator, a stationary receptacle within said refrigerator, a stirring device mounted for rotation within said receptacle, a gear surrounding the upper portion of said receptacle and mounted for rotation with respect thereto, a bar fixed to said stirring device positioned above and exterior of said receptacle, means for rotating said gear, and means for attaching said bar to said gear for rotation therewith.

8. In apparatus for the manufacture of ice cream, a refrigerator, a stationary cylindrical receptacle within said refrigerator, a stirring device mounted for rotation within said receptacle, a circular gear surrounding the upper portion of said receptacle and mounted for rotation relative thereto, pairs of lugs oppositely disposed on said gear, a bar fixed to said stirring device positioned above and exterior of said receptacle and held between said pairs of lugs, and means for imparting rotation to said gear.

9. In apparatus for the manufacture and dispensing of ice cream, a soda fountain, a cooling device within said soda fountain, a dispensing can within said fountain, a dasher mounted for rotation within said can, a gear surrounding the upper portion of said can and mounted for rotation with respect thereto, a bar fixed to said dasher positioned above and exterior of said can, means for rotating said gear, and means for attaching said bar to said gear for rotation therewith.

10. In apparatus for the manufacture and dispensing of ice cream, a soda fountain, a cooling device within said fountain, a dispensing can within said fountain, a dasher mounted for rotation within said can, a gear surrounding the upper portion of said can and mounted for rotation with respect thereto, pairs of lugs oppositely disposed on said gear, a bar fixed to said dasher positioned above and exterior of said can and held between said pairs of lugs, and means for imparting rotation to said gear.

11. In apparatus for the manufacture and dispensing of ice cream, a soda fountain, a cooling device therein, a plurality of dispensing cans within said fountain, dashers mounted for rotation within said cans, a gear surrounding the upper portion of each of said cans and mounted for rotation with respect thereto, oppositely disposed pairs of lugs on said gears, bars fixed to said dashers positioned above and exterior of said cans and held between said pairs of lugs, a drive shaft, and worms on said drive shaft for imparting rotation to each of said gears.

MILTON R. LAYMAN.